United States Patent [19]
Benincasa

[11] Patent Number: 5,351,301
[45] Date of Patent: Sep. 27, 1994

[54] AUTHENTICATOR CIRCUIT

[75] Inventor: Ronald M. Benincasa, Pasadena, Md.

[73] Assignee: The United States of America as represented by the Director of National Security Agency, Washington, D.C.

[21] Appl. No.: 129,047

[22] Filed: Mar. 3, 1980

[51] Int. Cl.$^5$ .............................................. H04L 9/00
[52] U.S. Cl. ...................... 380/50; 331/78; 364/717
[58] Field of Search .................. 178/22; 331/78; 364/717; 235/92 SH; 375/114–116; 380/50

[56] References Cited

U.S. PATENT DOCUMENTS

| | | | |
|---|---|---|---|
| 3,662,337 | 5/1972 | Low . | |
| 3,700,806 | 10/1972 | Vasseur | 178/22 |
| 3,749,832 | 7/1973 | Lemoine | 178/22 |
| 3,751,648 | 8/1973 | Wu | 364/717 |
| 3,885,139 | 5/1975 | Hard | 364/717 |
| 3,895,349 | 7/1975 | Robson | 375/115 |
| 3,911,216 | 10/1975 | Bartek | 178/22 |
| 3,988,538 | 10/1976 | Patten | 178/22 |
| 4,009,374 | 2/1977 | Taylor | 235/92 SH |
| 4,023,026 | 5/1977 | O'Farrell | 364/717 |
| 4,165,444 | 8/1979 | Gordon | 178/22 |

Primary Examiner—David C. Cain
Attorney, Agent, or Firm—John R. Utermohle; Thomas O. Maser

[57] ABSTRACT

An authenticator circuit and message authentication apparatus. The circuit includes a plurality of shift register stages, some of which are separated by adders having an input from a succeeding stage. Switching circuits selectively control the second adder inputs to determine the shifting sequence of information passing through the register stages. A message authentication apparatus includes a key generator and authenticator circuit converted at the output of a transmitter. The input of a receiver includes a similar authenticator circuit and key generator, plus a counter.

7 Claims, 2 Drawing Sheets

AUTHENTICATOR CIRCUIT

BACKGROUND OF THE INVENTION

1. Field of the Invention

This invention relates to the field of digital communications, and more specifically to authentication of binary coded communications.

2. Description of the Prior Art

Vast quantities of information are routinely transmitted from one place to another by means which allow a message to be intercepted by unauthorized persons. In many cases serious harm could result if such persons were able to transmit their own improper messages in place of an authorized one, or to transmit previously intercepted proper messages at an improper time. Examples of communication systems where harm could occur from such unauthorized transmissions include funds transfer and accounting messages between financial institutions and command and control information for satellites. There is a need for means which allow the receiver of a message to be assured that the message has been correctly received and that it was transmitted from an authorized source.

A method well known in the prior art for insuring that a message has been received without errors is by use of cyclic error correcting codes generated by feedback registers. A substantial amount of literature is available on such codes; for example, see W. Wesley Peterson, *Error-Correcting Codes*, MIT, 1961. A particular type of cyclic code generator described therein is known as a Galois register. FIG. 1 illustrates such an apparatus with an 8-stage binary shift register S divided by a first mod-2 adder 10 between the third and fourth stages $S_3$ and $S_4$ respectively, and a mod-2 adder 11 between the fifth and sixth stages. A third mod-2 adder 12 sums the contents of $S_8$ and an external input $I_1$, with the sum provided as an input to $S_1$. Following an initial preset step where the stages are loaded with some sequence of binary digits, the contents of each stage of the register at a given time t is a known function of the register contents at time $t-1$, one clock pulse earlier and the external input $I_1^t$. Specifically with reference to FIG. 1, the contents of stage 6 at time t is equal to the contents of stage 8 at time $t-1$ plus the contents of stage 5 at $t-1$, or $$S_6^t = S_8^{t-1} \oplus S_5^{t-1}$$

where $\oplus$ indicates mod-2 addition.

Similarly, $$S_8^t = S_7^{t-1}$$

$$S_7^t = S_6^{t-1}$$

$$S_5^t = S_4^{t-1}$$

$$S_4^t = S_8^{t-1} \oplus S_3^{t-1}$$

$$S_3^t = S_2^{t-1}$$

$$S_2^t = S_1^{t-1}$$

$$S_1^t = S_8^{t-1} \oplus I_1^t.$$

FIG. 2 illustrates a similar apparatus with an 8-stage register T broken by a first mod-2 adder 20 between stages $T_2$ and $T_3$, a second mod-2 adder 21 between stages $T_6$ and $T_7$, and a third mod-2 adder 22 providing the sum of $T_8$ and to $T_1$. This register steps according to the rules $$T_8^t = T_7^{t-1}$$

$$T_7^t = T_8^{t-1} \oplus T_6^{t-1}$$

$$T_6^t = T_5^{t-1}$$

$$T_5^t = T_4^{t-1}$$

$$T_4^t = T_3^{t-1}$$

$$T_3^t = T_8^{t-1} \oplus T_2^{t-1}$$

$$T_2^t = T_1^{t-1}$$

$$T_1^t = T_8^{t-1} \oplus I_2^t.$$

The manner in which Galois registers are used for error detecting is well known, and will not be discussed here. Details are available in the above-identified reference by Peterson.

SUMMARY OF THE INVENTION

It is desirable to communicate information freely both with assurance that a message received is in fact an authorized message from an authorized source, and that the message has been received without error.

Accordingly it is an object of this invention to provide an apparatus for authenticating transmitted messages.

It is a further object to provide a communication means which insures that a message has been received without error.

It is also an object to provide message authentication by testing agreement between a transmitted and a separately generated authentication word.

A further object is to generate the authentication word in a manner which is not readily discoverable by one having access only to the message and the authentication word.

It is a still further object to provide an authentication means in which a choice of stepping rules is controlled by a pseudorandom key stream.

An apparatus having the above advantages and others would include a plurality of delay stages connected to form a shift register; a first mod-2 adder inserted between two consecutive stages of the register, the output of the preceeding stage forming one input of the adder and the output of the adder forming the input to the succeeding stage; first and second terminals for providing information to the apparatus; a second mod-2 adder having an input from the first terminal, an input from the last stage of the register, and an output connected to the first stage of the register; means controlled by data provided on the second terminal for selectively switching either the information in the last delay stage or a zero to the second input of the first adder; and an output terminal connected to a selected one of the register stages.

BRIEF DESCRIPTION OF THE DRAWINGS

My invention may be best understood by reading the specification with reference to the attached drawings, which.

DESCRIPTION OF THE PREFERRED EMBODIMENTS

Figure 3:
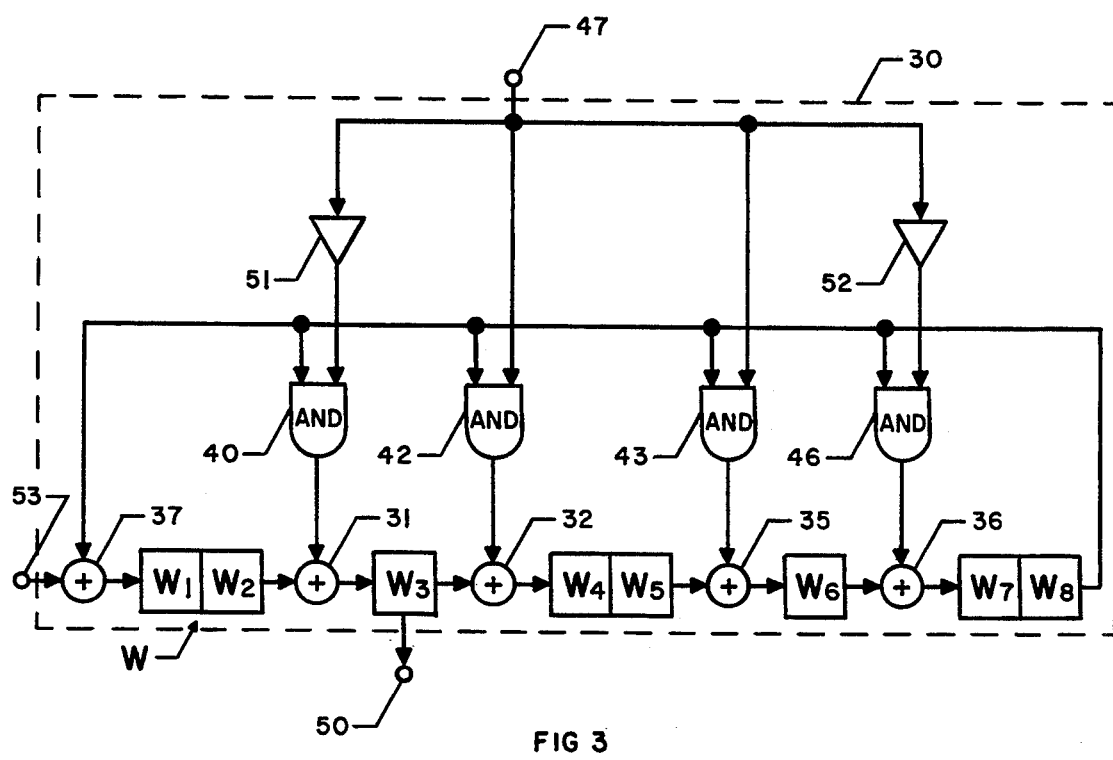
FIG. 3 is a logic diagram of a modified Galois register incorporating certain elements of my invention.

An authenticator circuit 30 is illustrated in FIG. 3. A Galois register W includes a plurality of delay stages $W_1$, $W_2$, $W_8$. Selected stages of register W are connected directly to the preceeding stage such that a clock pulse will shift the contents of a stage directly into the next; specifically, the contents of $W_1$ will shift into $W_2$, $W_4$ into $W_5$, and $W_7$ into $W_8$. Other stages are separated by a mod-2 adder, or "Exclusive OR", with adder 31 connecting $W_2$ to $W_3$, adder 32 connecting $W_3$ to $W_4$, adder 35 connecting $W_5$ to $W_6$ and adder 36 connecting $W_6$ to $W_7$. An adder 37 connects a terminal 53 to $W_1$. The output of $W_8$ is connected to each of the adders through binary AND gates; AND gate 40 connects $W_8$ to adder 31, AND gate 42 connects $W_8$ to adder 32, AND gate 43 connects $W_8$ to adder 35, and AND gate 46 connects $W_8$ to adder 36. $W_8$ is also connected directly to an input of adder 37. An input key terminal 47 is connected through an inverter 51 to AND gate 40 and through an inverter 52 to AND gate 46. In addition, key terminal 47 is connected directly to AND gates 42 and 43. An authenticator output terminal 50 is connected to the output of one of the register stages, which in this embodiment is selected to be $W_3$.

Assume that the key terminal 47 is held to a constant binary "0". Because one of the inputs to AND gates 42 and 43 is held to "0", the output of AND gates 42 and 43 will be "0" regardless of the contents of $W_8$. The resulting effect is that $W_3$ will shift directly into $W_4$, and $W_5$ will shift directly into $W_6$ as if adders 32 and 35 were not present. The same "0" applied to terminal 47 will appear at AND gates 40 and 46 as a constant "1" because of inverters 51 and 52. The outputs of AND gates 40 and 46 will then take the value of $W_8$, $W_3$ will be the sum of $W_8$ and $W_2$, and $W_7$ will be the sum of $W_8$ and $W_6$. It is apparent that when the input on key terminal 47 is "0", register W steps according to the rules set forth above with respect to FIG. 2.

Assume now that the input to key terminal 47 is held to a constant "1". Inverters 51 and 52 cause one input of AND gates 40 and 46 to appear as a continuous "0", which necessarily means that the output of AND gates 40 and 46 are also a continuous "0" regardless of the content of $W_8$. $W_2$ then shifts directly into $W_3$ and $W_6$ shifts directly into $W_7$ as if adders 31 and 36 were not present. Because a constant "1" is presented to AND gates 42 and 43, their outputs assume the value of the second input, $W_8$. $W_6$ is then the sum of $W_8$ and $W_5$, and $W_4$ is the sum of $W_8$ and $W_3$. It is apparent that when the input to key terminal 47 is "1", register W steps according to the rules set forth above with respect to FIG. 1.

Figure 1:
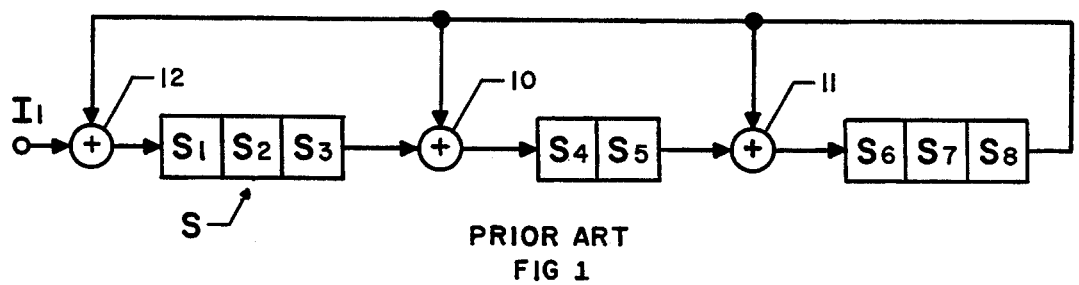
FIG. 1 is a logic block diagram of a simple Galois register typical of the type known in the prior art.
Figure 2:
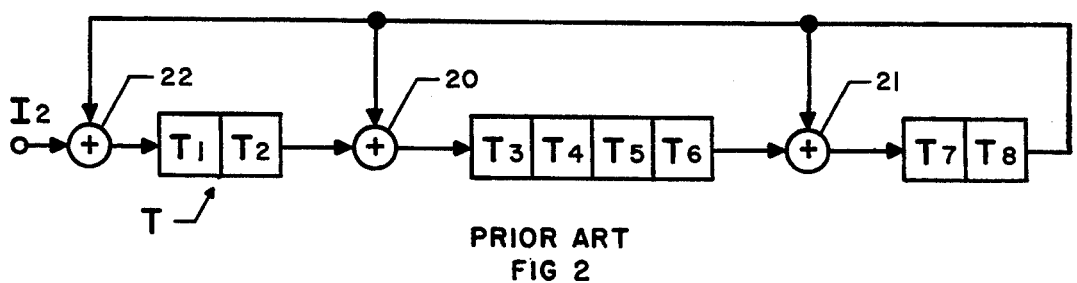
FIG. 2 is a logic diagram of a second example of a Galois register.

The key terminal 47 may be connected to a pseudorandom pattern source to cause authenticator 30 to "randomly" switch back and forth between the mode of FIG. 1 and that of FIG. 2. For the purpose of this description, the term "pseudorandom pattern" is defined to mean a reproducable binary data stream which is generated according to a known rule, but which appears to be random to one who is unaware of the method of generation. The source for the pseudorandom pattern may be, for example, a maximum length linear sequence generator of the Galois register type. The pattern which emerges at terminal 50 is thus dependent on the initial fill of register W, the number of clock pulses which have occurred since the initial fill, the data pattern provided at input terminal 53 and the pseudorandom pattern provided at key terminal 47. A practical use to which the authenticator of FIG. 3 may be put is described below with reference to FIGS. 4 and 5.

Figure 4:
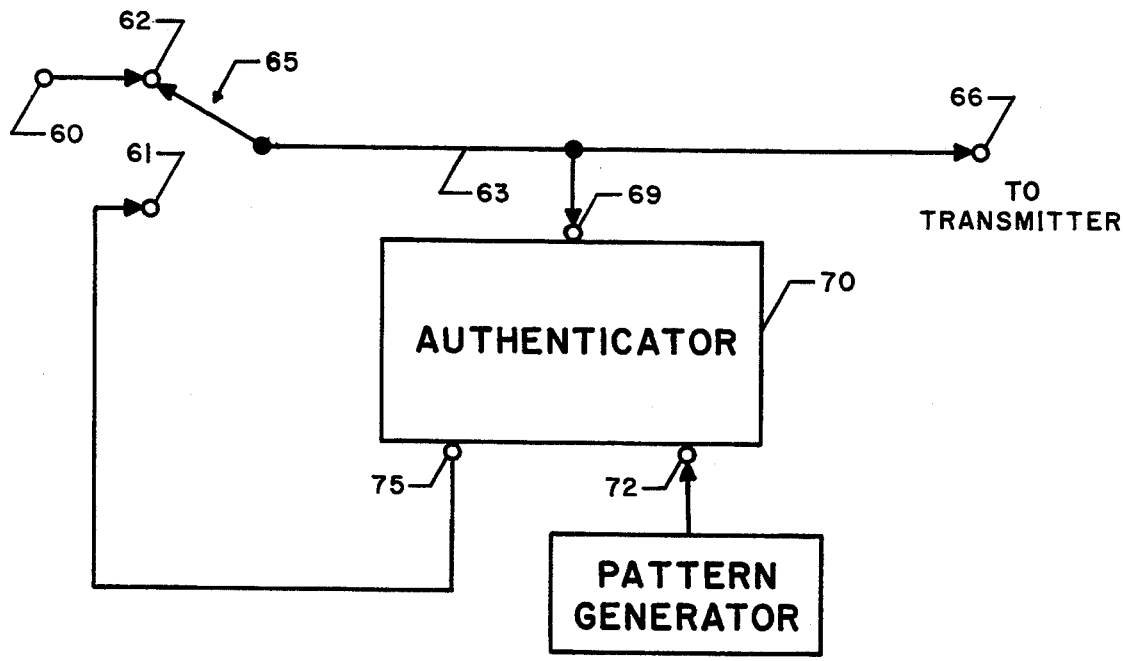
FIG. 4 is a block diagram of a transmitter attachment incorporating the elements of my invention.

FIG. 4 illustrates an apparatus capable of providing message authentication for a transmitted message. A communications path 63 includes a message input terminal 60 connected through contact 62 of a two-position switch 65 to an output terminal 66. Input 69 of an authenticator circuit 70 is also connected to the communications path 63. A pseudorandum pattern generator 71 connects to authenticator 70 through terminal 72. Authenticator output 75 is connected to contact 61 of switch 65. Authenticator 70 may be of the type shown in FIG. 3 with input 69 corresponding to input 53, input 72 corresponding to input 47, and output 75 corresponding to output 50.

Operation of authenticator 70 is in three phases: initialization, message transmission, and authenticator transmission. During initialization, register W is loaded with a predetermined initial fill pattern. No specific means for this is shown because means of initializing shift register stages are well known. A message transmission phase follows with the message to be transmitted provided at terminal 60 while switch 65 is turned to contact 62. The message, which is a binary data sequence, is provided directly to terminal 66 which is connected to a conventional transmitter apparatus such as a radio or microwave transmitter. The transmitted message is simultaneously provided to authenticator 70 through terminal 69. A key generator or similar pseudorandom pattern source 71 is simultaneously started, feeding input terminal 72. Throughout the message transmission phase, authenticator 70 is stepping sequentially and the W register stages are changing. The data on output terminal 75 is not utilized because of the open circuit at contact 61. Following the transmission of the final bit of message, switch 65 is turned to contact 61 and authenticator 70 and key generator 71 are stepped some additional number of times. This authentication phase provides output data from terminal 75 to terminal 66 for transmission to the receiver. Upon completion of the authentication phase, the transmission ends.

Figure 5:
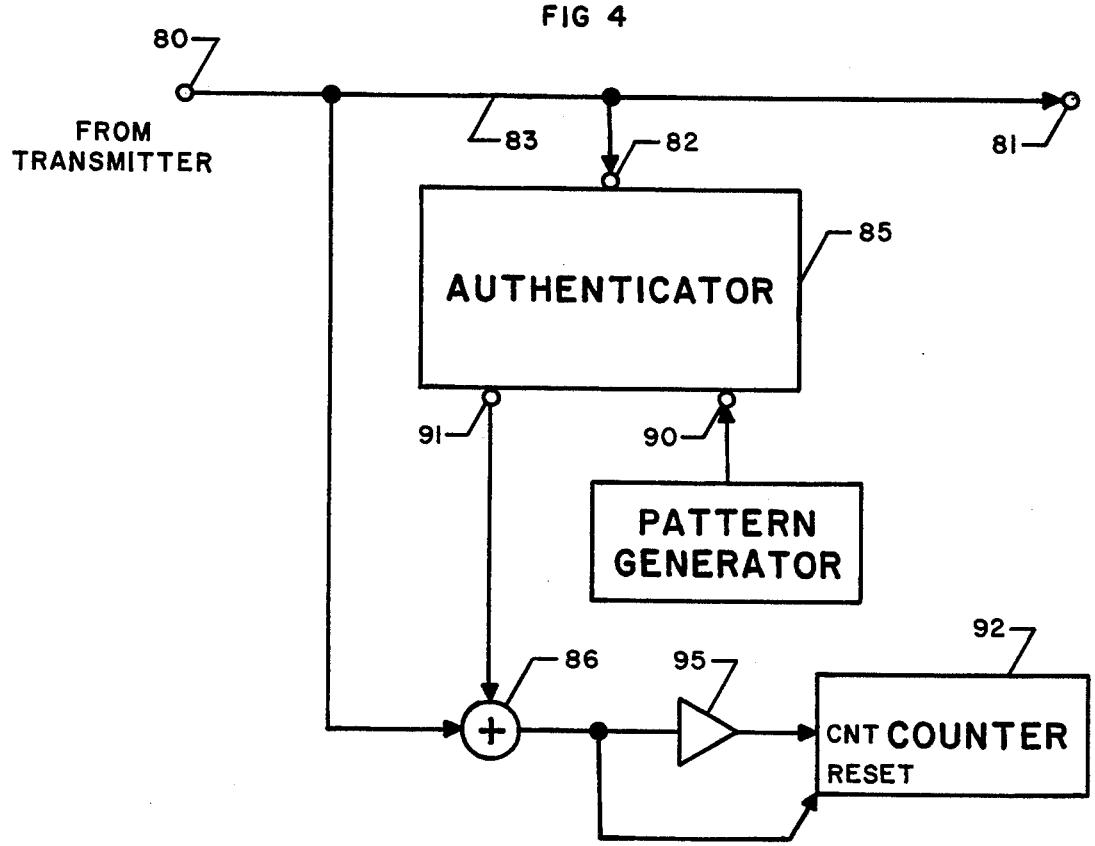
FIG. 5 is a block diagram of a receiver attachment incorporating the elements of my invention.

FIG. 5 illustrates the receiver portion of an apparatus capable of authenticating a message transmitted by the apparatus described in connection with the circuit of FIG. 4 above. A communications path 83 includes a data input terminal 80 connected to an output terminal 81. Input terminal 82 of an authenticator 85 and one input of a 2 input mod-2 adder 86 are also connected to the communications path 83. A key generator or similar pseudorandom pattern generator 87 connects to terminal 90 of authenticator 85. Output terminal 91 connects to the second input of adder 86. Common communication requires that pattern generator 87 be identical to generator 71 of FIG. 4, and that authenticator 85 be identical to authenticator 70. The output of adder 86 is connected through an inverter 95 to the "count" input of a binary counter 92 and directly to the reset input of counter 92.

Prior to reception of data from the apparatus of FIG. 4, pattern generator 87 must be operating synchronously with generator 71, and the register stages of authenticator 85 must be preset the same as the stages of authenticator 70. The message bit stream on terminal 66 of FIG. 4 reaches terminal 80 and is passed directly to output 81 which is preferably connected to some type of storage device where the message may be retained until authenticity has been established. Because the sequences at authenticator inputs 82 and 72 are identical to those at inputs 69 and 90 (FIG. 4) the sequence at output 91 will be identical to that at output 75. A "1" will appear on the output of adder 86 when data bits at terminals 80 and 91 are dissimilar, causing a "1" at the reset input of counter 92 which resets the counter to zero. When the data bits at terminals 80 and 91 are the same, the output of adder 86 will be a "0", which causes a "1" to appear at the count (CNT) input of counter 92 because of inverter 95. The value of the counter 92 at any time will thus be equal to the number of consecutive agreements of the bits at terminals 80 and 91. During that time which corresponds to the message transmission phase described above, there is no direct correlation between these two streams so the output of adder 86 is essentially random and the value in the counter 92 remains quite low. Following the message transmission phase, the authenticator transmission received at terminal 80 will be identical to that generated by authenticator 85 and there will be exact correlation of the two inputs to adder 86. Counter 92 will thus increment continuously, without resetting, to a number greater than or equal to the number of bits in the authenticator transmission sequence. The message is determined to be authentic by noting the value in counter 92 following the final phase. This value must be at least as great as the number of bits in the authenticator transmission sequence. If not, either an error was generated during the course of transmission or an improper authenticator sequence was present. Either event cautions the use of the received message to obtain further authentication prior to utilizing the message.

I have thus described an authenticator circuit in a system in which the circuit may be utilized to insure that a message has been received without error and from an authorized source. Numerous modifications are possible, including varying the length and shifting rules of the feedback register and utilizing more than one interconnected register within the authenticator circuit. In addition, further security might be obtained by separately encoding the message either prior to or after utilization of the authenticator. I do not intend that my invention be limited to the precise embodiment illustrated above, but rather to that which is claimed hereinbelow.

I claim:

1. An apparatus, comprising:
   a plurality of delay stages connected to form a shift register;
   a first mod-2 adder inserted between two consecutive stages of said register, the output of the preceeding stage forming one input of said adder and the output of the adder forming the input to the succeeding stage;
   a first terminal for providing information to said apparatus;
   a second terminal for providing information to said apparatus;
   a second mod-2 adder having an input from said first terminal, an input from the last stage of said register, and an output connected to the first stage of said register;
   means controlled by data provided on said second terminal for selectively switching either the information in the last delay stage or a zero to the second input of said first adder; and
   an output terminal connected to a selected one of said register stages.

2. The apparatus of claim 1, further comprising:
   a plurality of mod-2 adders each inserted between two consecutive stages of said register in the manner of said first adder, and
   wherein said control means includes means for selectively switching either the information in the last delay stage or a zero to the second input of each of said plurality of adders.

3. The apparatus of claim 1, wherein said control means includes a two-input binary AND gate having a first input from said last stage, a second input from said second terminal, and an output connected to the second input of said first adder.

4. The apparatus of claim 1 or 2, further comprising:
   a key generator connected to said second terminal;
   a communications path including a data input; and
   means for selectively switching either said data input or said output terminal to said first terminal.

5. The apparatus of claim 1 or 2, further comprising:
   a key generator connected to said second terminal;
   a communications path including a data input connected to said first terminal; and
   means for comparing signals provided on said data input and said output terminal.

6. The apparatus of claim 5 wherein said comparing means includes means for counting the number of consecutive signal data agreements.

7. The apparatus of claim 5 wherein said comparing means includes:
   a counter, and
   a mod-2 adder operatively connected to sum the signals on the output of said data input and said output terminal and to provide the result as the input of said counter.

* * * * *